March 31, 1931.  H. DEVLIN  1,798,728
PAN TRIPPER FOR BISCUIT MACHINES
Filed June 28, 1930
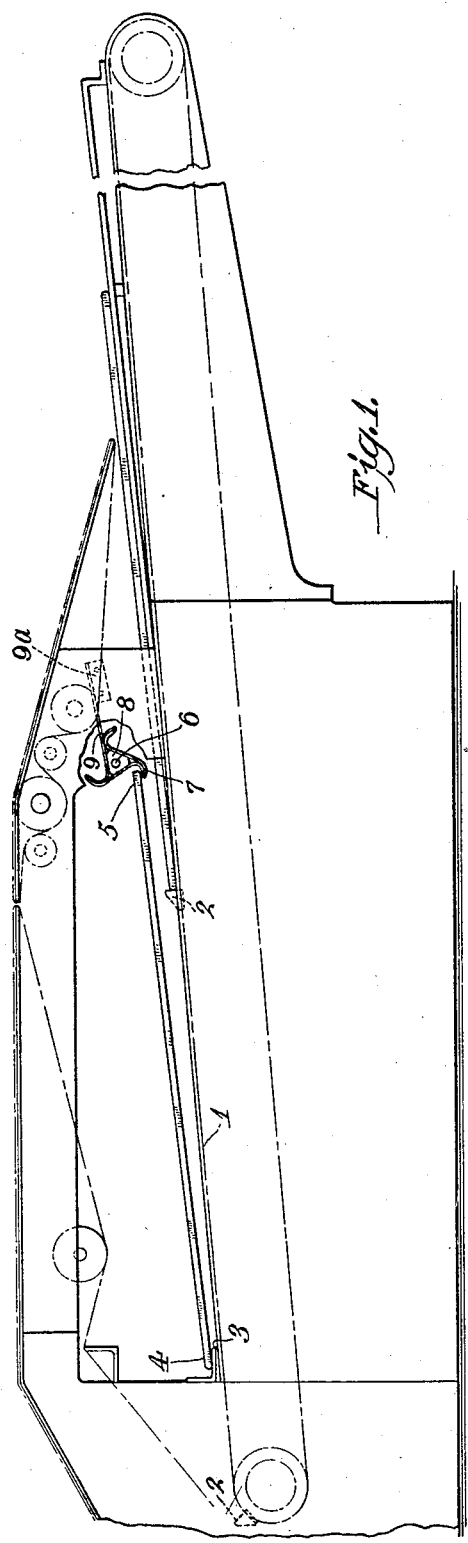
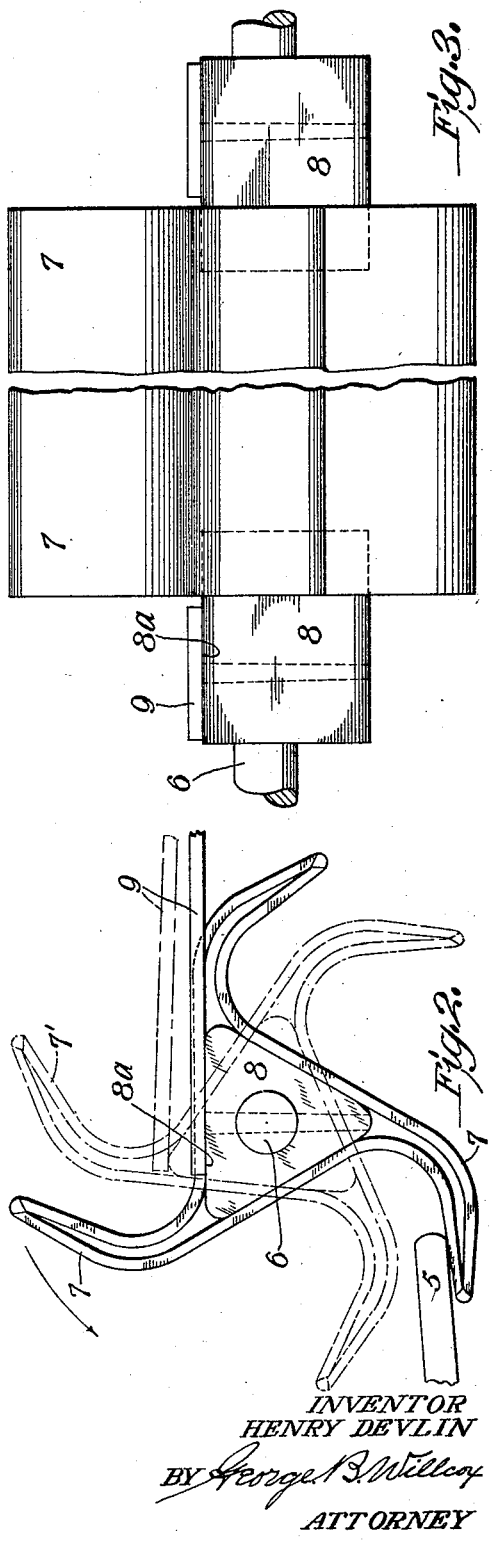
INVENTOR
HENRY DEVLIN
BY George B. Willcox
ATTORNEY Patented Mar. 31, 1931

1,798,728

UNITED STATES PATENT OFFICE

HENRY DEVLIN, OF SAGINAW, MICHIGAN, ASSIGNOR TO BAKER PERKINS COMPANY, INC., OF SAGINAW, MICHIGAN, A CORPORATION OF NEW YORK

PAN TRIPPER FOR BISCUIT MACHINES

Application filed June 28, 1930. Serial No. 464,609.

This invention relates to machines for loading rows of dough-pieces onto pans or trays preparatory to baking and pertains more particularly to panning machines of the type having a panner belt that brings the dough-pieces from the cutting machine and deposits them, by the assistance of a panner blade, upon pans that are being moved on a conveyor beneath the delivery edge of the panner blade and thence out of the panning machine from which the pans are transported into the oven in known manner.

In machines of the kind referred to the empty pans are supplied to the machine one at a time, being slid into the space above the conveyor and beneath the panner belt. Each pan so introduced is temporarily supported at its rearward and forward edges. The forward support heretofore has usually been arranged to tilt, swing or oscillate and thus withdraw from beneath the forward edge of the pan, letting the forward part of the pan drop down upon the pan conveyor. The conveyor is usually fitted with pan-engaging lugs that are spaced apart in the direction of travel of the conveyor approximately the length of a pan. The pan drops when released by the forward support, and the next lugs on the conveyor engage its rear edge and propel it past the panner plate and thence out of the machine.

In practice considerable difficulty has been encountered in the operation of machines of the kind described because of buckling or jamming of the pans while they are resting upon or being released from the rearward and forward supports above mentioned and it frequently occurred that a pan became warped and did not drop properly when the forward swinging support was withdrawn, usually by the action of the pan conveyor. This jamming was partly due to the slowness with which the swinging support under the forward edge of the pan was withdrawn by the slow movement of the conveyor and lugs by which it was actuated.

It is an object of my present invention to provide an improved means for temporarily supporting the pan when it is first introduced into the panning machine and especially to improve the construction and mode of operation of the mechanism whereby the support at the forward edge of the pan is suddenly withdrawn.

I provide a temporary pan support having pan-holding claws that are preferably arranged to rotate after the manner of a star wheel, their rotation being so controlled that the claws are successively brought into position for supporting the forward edges of successive pans, and then, at each operation for the deposit of a pan on the conveyor pan, the pan-supporting claw is suddenly jerked from underneath the forward edge of the pan and far enough away to completely free it. The next claw, in assuming its position to support the next pan, is caused to travel downward quickly and thus acts as a positive displacer or knocker by which the pan, if its forward edge fails to drop when the support is removed, will be positively knocked or driven down onto the conveyor, entirely eliminating any chance of jamming.

A further object is to provide in combination with a rotatable supporting member for the front edge of the pans a spring-actuated detent device that temporarily positions the supporting claws to carry the front edge of the pan and then is pushed forward and partly rotated by means of the advancing front edge of the pan itself. The spring detent then suddenly snaps the next claw into position and in so doing causes the claw to act as a knocker that positively drives the pan down onto the conveyor, if the pan shows any tendency to stick or bind and fails to drop of its own accord.

With the foregoing and certain other objects in view, which will appear later in the specification, my invention comprises the devices described and claimed and the equivalents thereof.

In the drawings Fig. 1 is a side elevation, partly diagrammatic and broken away, showing a panner blade in position over a pan-forwarding conveyor, and my improved pan-holding device operatively associated therewith.

Fig. 2 is an end view, to an enlarged scale, showing the pan supporting claws and the spring-actuating detent embodied as a cam, the action of the spring for snapping successive claws into operative position being indicated by dotted lines.

Fig. 3 is a side view, broken away in part, of the parts shown in Fig. 2.

Numeral 1 designates the usual traveling conveyor equipped with pan-engaging lugs 2 spaced along the conveyor at distances slightly greater than the length of the pans. Above the conveyor 1 and at the left-hand or rearward edge of the pan, as shown in Fig. 1, is a fixed supporting plate 3, upon which the rearward part 4 of the pan is rested when the pan is introduced into the machine. The forward edge 5 of the pan rests upon a temporary support which constitutes a part of the claimed subject-matter of the present invention. It consists of a bar 6 which is rotatable about its longitudinal axis and has one or more outwardly extending claws 7 shaped substantially as shown in Figs. 2 and 3. The claws may be of any suitable shape and may be spaced apart along the length of the bar 6 like the tines of a fork, or they may be made, as shown in Fig. 3, of a continuous strip that extends across the machine the full width of the pan.

Near each end of bar 6 is a spring-actuated detent 8 that is operatively arranged to effect quick withdrawal of the supporting claw 7 from beneath the forward edge 5 of the pan. Preferably the detent is in the form of a cam fixed to the bar 6 and presenting three facets 8a. A spring 9 is mounted on a fixed support 9a so as to ride the cam 8 during its partial rotation and to engage each of the facets 8a in succession, the facets 8a and the claws 7 being angularly indexed with respect to each other on the bar 6 so that when the spring 9 is engaging one of the facets 8a, as shown in Fig. 2, a corresponding claw 7 will be held in position to support the forward edge 5 of the pan, and when a claw 7 has been rotated in the direction of the arrow in Fig. 2 to the position shown by dotted lines at 7' in Fig. 2, the spring 9 will thereupon suddenly snap the bar 6 farther around and thereby suddenly withdraw the claw 7 from beneath the edge 5 of the pan. The next succeeding claw is thereby snapped downward to its pan-supporting position, and if for any reason the pan 5 is reluctant to drop, the down-coming claw strikes it down onto the conveyor 1, as previously described.

The initial turning movement is imparted to the bar 6 and its claw 7, preferably by the forward end 5, Fig. 2, of the pan itself while the pan is being advanced by the conveyor lugs 2 that are in engagement with the edges of the pan.

In operation the attendant places an empty pan on the supports 3 and 7. The next lug 2 of the conveyor 1 comes past the support 3, and engages the rearward edge 4 of the pan, or any other part of it. The pan then moves forward and its advancing edge 5 pushes the star wheel quick-release claw 7, to the right in Figs. 1 and 2, and when the claw is rotated sufficiently the spring 9 acts to snap it around to its next position of rest and holds it there. The supporting claw 7 is jerked, by the action of the spring and cam, from beneath the edge 5 of the pan and moves to the right much faster than the pan itself is traveling. Consequently the front edge 5 of the pan is entirely freed. The next succeeding claw immediately comes down into position to receive the next pan. Meanwhile the first pan has dropped onto the conveyor and is propelled out of the machine past the panner plate in the usual manner.

Although I prefer to mount the claws 7 on the rotating bar 6 and to actuate them by a cam having facets that are engaged by a spring, I do not desire to limit my invention to these specific details, for it is obvious that any other arrangement of claws or temporary supports, whereby they are successively brought into pan-supporting position and then are successively snapped clear of the advancing edge of the pan, would come within the scope of my invention as set forth in certain of the claims, irrespective of the path of travel of the claws while not in use.

Having thus described my invention, what I claim and desire to secure by Letters Patent is:

1. In combination, a traveling conveyor having lugs, a support for the rearward part of a pan positioned above the conveyor and extending crosswise thereof in the path of travel of said lugs, a quick-releasing support for the forward edge of said pan comprising a bar rotatable about its longitudinal axis and having outwardly extending claws arranged to be contacted and partly rotated by the forward edge of the pan while it is being advanced by the conveyor, a cam fixed to said bar and presenting facets, a spring mounted to ride said cam during its rotation and to engage each facet in succession, thereby placing the outer end of a corresponding claw in position for temporarily supporting the forward edge of the pan, said cam and spring arranged to coact to effect quick removal of the claw from beneath the forward edge of the pan after said partial rotation of the claw.

2. In combination, a traveling conveyor having pan-engaging lugs, a fixed support for the rearward part of a pan positioned above the conveyor and extending crosswise thereof in the path of travel of said lugs, a quick-releasing support for the forward edge of said pan comprising a bar rotatable about its longitudinal axis and having outwardly extending claws arranged to be engaged and partly rotated by the forward edge of the pan while it is being advanced by the conveyor, a spring-actuated detent arranged to so place said bar as to bring each claw in succession into position for supporting the forward edge of a pan and to releasably constrain the claw in that position, said detent and its actuating spring being also arranged to effect quick removal of the claw from beneath the forward edge of the pan after such partial rotation by the pan.

3. In combination, a traveling conveyor having pan-engaging lugs, a support for the rearward part of a pan positioned above the conveyor and extending crosswise thereof in the path of travel of said lugs, a support for the forward edge of pan comprising claws arranged to be moved forwardly in regular order by engagement of one of them with the forward edge of the pan while being advanced by the conveyor, a spring-actuated detent operatively arranged to effect quick removal of the claw from beneath the edge of the pan during said forward movement of the pan, said detent and its actuating spring being also arranged to locate the next succeeding claw in position for supporting the forward edge of the next succeeding pan and to releasably constrain the claw in that position.

4. In combination, a traveling conveyor having pan-engaging lugs, a fixed support for the rearward part of a pan positioned above the conveyor and extending crosswise thereof in the path of travel of said lugs, a quick-releasing support for the forward edge of said pan comprising a bar rotatable about its longitudinal axis and having outwardly extending claws arranged for partial rotation by means of the conveyor lugs, a spring-actuated detent operatively arranged to releasably constrain each claw in succession in position for supporting said forward edge of the pan, to effect quick removal of said claw for releasing said pan after such partial rotation of the claw, and to simultaneously move a succeeding claw into pan-supporting position.

In testimony whereof, I affix my signature.

HENRY DEVLIN.